US008156544B2

(12) United States Patent
Fuccello

(10) Patent No.: US 8,156,544 B2
(45) Date of Patent: Apr. 10, 2012

(54) SYSTEM AND METHOD FOR A WPAN FIREWALL

(75) Inventor: James R. Fuccello, Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 515 days.

(21) Appl. No.: 12/195,085

(22) Filed: Aug. 20, 2008

(65) Prior Publication Data

US 2010/0050238 A1 Feb. 25, 2010

(51) Int. Cl.
*G06F 7/04* (2006.01)
*H04B 5/00* (2006.01)
(52) U.S. Cl. .......................................... 726/3; 455/41.1
(58) Field of Classification Search ........ 726/3; 455/41.1
See application file for complete search history.

(56) References Cited

U.S. PATENT DOCUMENTS

| | | | |
|---|---|---|---|
| 2004/0147351 A1 | 7/2004 | Peikari | |
| 2004/0268145 A1* | 12/2004 | Watkins et al. | 713/201 |
| 2005/0113102 A1* | 5/2005 | Kwon et al. | 455/450 |
| 2005/0213763 A1* | 9/2005 | Owen et al. | 380/270 |
| 2006/0161664 A1* | 7/2006 | Motoyama | 709/228 |
| 2008/0130567 A1* | 6/2008 | Jeon et al. | 370/329 |
| 2008/0181287 A1* | 7/2008 | Rofougaran | 375/222 |
| 2008/0196104 A1 | 8/2008 | Tuvell et al. | |
| 2009/0046677 A1* | 2/2009 | Toledano et al. | 370/338 |
| 2009/0154410 A1* | 6/2009 | Jeon et al. | 370/329 |

FOREIGN PATENT DOCUMENTS

WO 2010021954 2/2010

OTHER PUBLICATIONS

Bandyopadhyay, S. et al.: "A proposal for improvement in service-level security architecture of bluetooth" IEEE Tencon 2003. Conference on Convergent Technologies for the Asia-Pacific Region, Bangalore, India, Oct. 15-17, 2003; [IEEE Region 10 Annual Conference], New York, NY: IEEE, US LNKD-D01:10.1109/Tencon 2003.1273409, vol. 3, Oct. 15, 2003 I pp. 1057-1061Im XP010687427 ISBN: 978-0-7803-8162-9.
Othman M et al.: "Developing a Secure Mechanism for Bluetooth-based Wireless Personal Area Networks (WPANs) "Electrical Engineering, 2007. ICEE '07, International Conference on IEEE, P1 Apr. 1, 2007, pp. 1-4, XP031124683. ISBN: 978-1-4244-0892-4.
International Search Report and Written Opinion dated Apr. 16, 2010 in related case PCT/US2009/053971.
International Preliminary Report on Patentability for International Application No. PCT/US2009/053971 dated Feb. 22, 2011.
Canada Office Action mailed on Sep. 7, 2011 for Application No. 2,729,289.

* cited by examiner

*Primary Examiner* — Techane Gergiso

(57) ABSTRACT

Systems and methodologies for implementing Wireless Personal Area Network (WPAN) security are provided herein. As disclosed herein, firewall functionality can be implemented for a WPAN-capable device to control access to resources of the device over a WPAN. In one example, a WPAN protocol can be extended to include low-level access control measures that enable analysis of communication requests to and/or from a device prior to acting on the requests. As described herein, a WPAN firewall associated with a device can be configured to block, monitor, and/or log respective resource accesses to and/or from a WPAN. WPAN firewall functionality as described herein can be configured using mechanisms such as an Application Programming Interface (API) and/or a user control interface. Additionally, lateral regulation of security policies for a WPAN and one or more other networks utilized by a device can be provided.

15 Claims, 11 Drawing Sheets

SYSTEM AND METHOD FOR A WPAN FIREWALL

TECHNICAL FIELD

The subject disclosure relates generally to wireless networking, and more particularly to techniques for data security for a wireless personal area network.

BACKGROUND

As the global demand for mobile computing devices increases, an increasing amount of research has been conducted with regard to techniques for improving communication between portable devices. For example, advances in wireless communication technology have enabled the implementation and use of Wireless Personal Area Networks (WPANs), which allow a small number of devices (e.g., up to 8 devices) located in close proximity to one other to engage in high data rate wireless communication.

Various standards, such as Bluetooth, have been adopted or proposed for WPAN communication. However, these WPAN implementations have a number of security shortcomings. For example, if an attacker is able to successfully establish a WPAN connection with a target device, the WPAN generally provides no robust mechanism to prevent the attacker from accessing and obtaining sensitive information stored on the target device and/or from maliciously utilizing WPAN services via the target device. In addition, conventional WPAN implementations generally do not provide measures to prevent a non-owner of a device with physical access to the device, such as an individual operator of a corporately-owned device or a possessor of a stolen device, from establishing a WPAN with another device and transferring sensitive information out of the device over the WPAN or otherwise utilizing services of the established WPAN in an unauthorized manner. As a result of at least these security shortcomings of WPAN implementations and their public notoriety, many entities that could potentially benefit from the use of WPANs have been reluctant to adopt them. Accordingly, there is a need for network security techniques that mitigate at least the above shortcomings.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Systems and methodologies are provided herein that facilitate improved WPAN security. More particularly, various aspects described herein facilitate the implementation of firewall functionality for a WPAN-capable device in order to control access to resources of the device over one or more WPANs associated with the device. For example, a WPAN protocol utilized by the device can be extended to include low-level access control measures which enable analysis of communication requests to and/or from the device prior to the device acting on the requests. In one example, an allowed set of accesses for a WPAN-enabled device can be defined such that a firewall associated with the device blocks all accesses to and/or from a WPAN that do not fall within the allowed set. Additionally and/or alternatively, a firewall as described herein can monitor and log activity of a device over a WPAN. Logged WPAN activity can then be used to obtain information relating to attacking devices, to monitor usage of the device, and/or for other uses.

In accordance with one aspect, WPAN firewall functionality can be utilized to control both incoming requests from a WPAN-connected device as well as outgoing requests for communication over a WPAN originating from the device. Accordingly, firewall functionality as provided herein can be additionally used to monitor or restrict activities of persons with physical access to a device. In accordance with another aspect, a WPAN firewall as described herein can be configured by various means, such as via a user control interface or an Application Programming Interface (API). In one example, API firewall control can be implemented to restrict the ability of physical users of a device from modifying parameters of a firewall implemented on the device. Additionally, various aspects described herein can be utilized to laterally regulate security policies for a WPAN and one or more other networks utilized by a device, such as a Wireless Wide Area Network (WWAN) or a Wireless Local Area Network (WLAN).

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
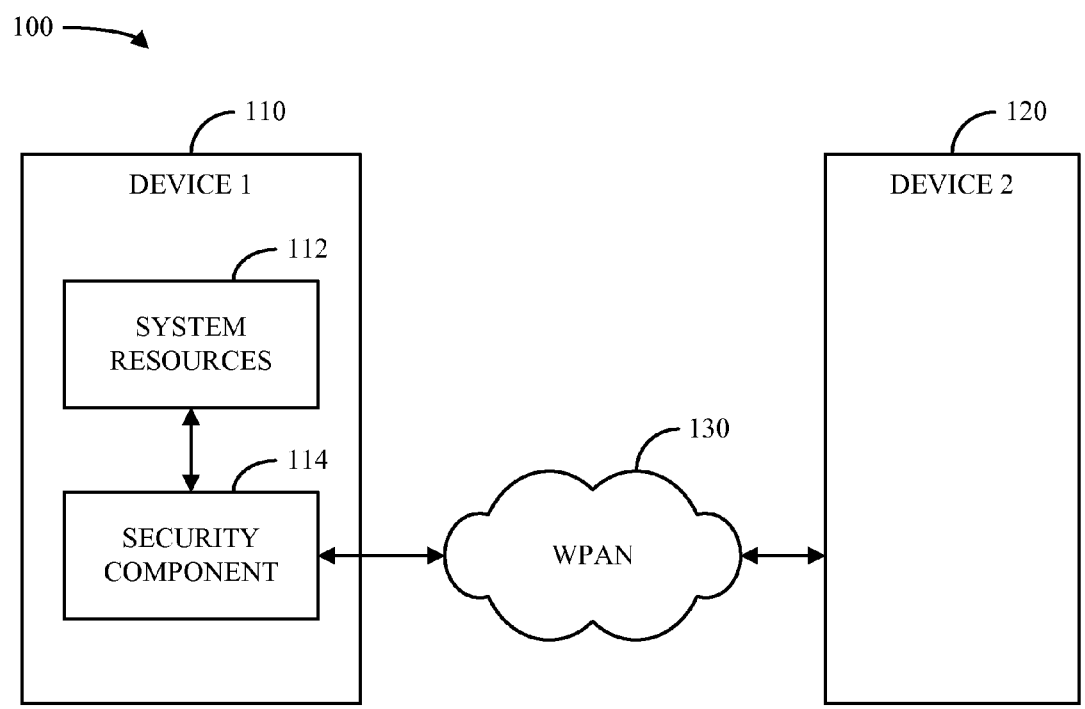
FIG. 1 is a block diagram of a system for securing a device connected to a wireless network in accordance with various aspects.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring now to the drawings, FIG. 1 illustrates a block diagram of a system 100 for securing a device connected to a wireless network in accordance with various aspects described herein. In one example, system 100 can include devices 110 and 120, which can communicate over a Wireless Personal Area Network (WPAN) 130. It is to be appreciated that devices 110 and/or 120 can be any suitable device of communicating over WPAN 130, such as a mobile telephone handset and/or headset, a Personal Digital Assistant (PDA), a barcode scanner, a desktop or laptop computer, and/or any other suitable fixed or mobile device. In addition, it should be appreciated that WPAN 130 can be based on, for example, a standard provided by the Institute of Electrical and Electronics Engineers (IEEE) 802.15 working group such as the IEEE 802.15.1 standard (e.g., Bluetooth) and/or any other suitable networking standard. Further, while system 100 illustrates only two devices 110 and 120, any suitable number of devices can engage in communication over WPAN 130.

In another example, a device 110 in system 100 can have various system resources 112 associated therewith, which can be utilized for communication over WPAN 130 and/or other operation of the device 110. For example, system resources 112 can include data files, programs, communication services or profiles (e.g., File Transfer Protocol (FTP), Object Exchange (OBEX), etc.), contact information (e.g., names, addresses, telephone numbers, etc.), and the like.

In accordance with one aspect, devices 110 and/or 120 utilizing a WPAN 130 can employ one or more conventional basic security features for communication over the WPAN 130. For example, devices 110 and/or 120 can utilize basic device authentication upon connecting to each other and/or to WPAN 130. Using basic authentication, a device can, for example, provide a message to a user and/or prompt for user approval upon detecting that another device wishes to connect to the device over a WPAN. Other security measures, such as requiring a Personal Identification Number (PIN) exchange between device prior to allowing a connection to be established therebetween over a WPAN, can additionally and/or alternatively be implemented. In addition, devices 110 and/or 120 can utilize active pairing, wherein a set of identified devices is given connection priority over unidentified devices. However, these conventional security measures are often provided as an optional feature on WPAN-capable devices, and as a result many users opt not to use these features, either out of prevention of perceived inconvenience and/or a lack of understanding of the security risks presented by not utilizing them. Further, such basic security measures may not be operable to prevent connections from all attackers who wish to authenticate with a device under false pretenses, intercept a network passkey, or otherwise establish a connection with a device over a WPAN despite the presence of security measures.

Due to the nature of conventional WPAN communication, once a connecting device has established a connection over a WPAN to a target device, the connecting device is generally provided with full access to all resources of the target device. Traditionally, there has been no robust mechanism by which system resources 112 of a device 110 can be protected in the context of an existing connection over a WPAN 130 to another device 120. As a result, concern over these and other security implications have chilled the implementation of WPAN technology among individuals and organizations that would otherwise benefit from such technology.

Thus, in accordance with one aspect, a device 110 operating in system 100 can include a security component 114, which can be utilized to secure system resources 112 of the device 110 upon connection to another device 120 via a WPAN 130. In one example, the security component 114 can act as a firewall between an associated device 110 and a WPAN 130 to block and/or monitor various incoming and/or outgoing accesses to system resources 112 based on preconfigured criteria. As the security component 114 can be utilized to control access to system resources 112 of an associated device 110 at another device 120 connected to the associated device 110 over a WPAN 130, it can be appreciated that the security component 114 can mitigate the security shortcomings of traditional WPAN implementations.

In accordance with another aspect, the security component 114 can be configured in various manners to facilitate flexible access control to associated system resources 112. For example, an Application Programming Interface (API) and/or a user control interface can be provided to allow an owner of a device 110 associated with the security component 114 to control the operation of the security component 114. Additionally and/or alternatively, mechanisms can be provided by which operation of the security component 114 can be configured to match the operation of one or more other security measures provided at an associated device 110 for other network connections utilized by the device 110, such as a Wireless Local Area Network (WLAN) connection and/or a Wireless Wide Area Network (WWAN) connection.

Figure 2:
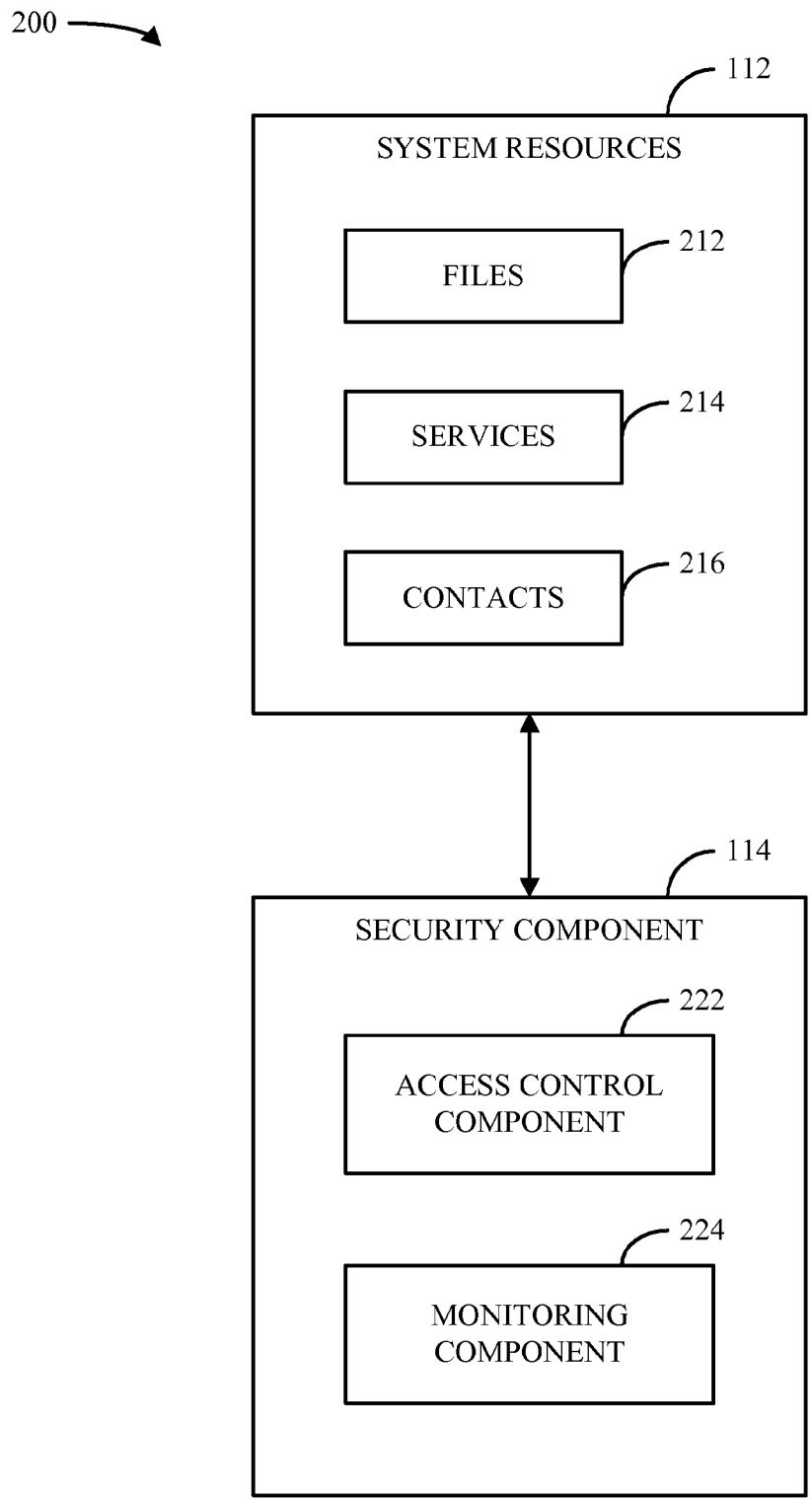
FIG. 2 is a block diagram of a system for securing system resources in accordance with various aspects.

Turning to FIG. 2, a system 200 for securing system resources 112 in accordance with various aspects is illustrated. As described above with respect to system 100, system resources 112 can include one or more files 212, services 214, information relating to contacts 216, and/or any other appropriate resources for communication and/or other functionality of an associated network-capable device. As FIG. 2 illustrates, system 200 can additionally include a security component 114, which can protect associated system resources 112 against unauthorized uses over a WPAN.

In one example, the security component 114 can manage both inbound and outbound communication requests involving system resources 112 in order to regulate inbound requests for the system resources 112 from WPAN-connected devices as well as outbound transfers of the system resources 112 from the device on which they are stored over a WPAN. Accordingly, an owner of a device having sensitive information stored thereon can prevent non-owners of the device having physical access to the device from transferring the sensitive information from the device over a WPAN. Examples of such non-owner users can include, but are not limited to, a possessor of a lost or stolen device, a user of a corporately-owned and/or fleet-owned device, or the like.

In accordance with one aspect, the security component 114 can include an access control component 222 that analyzes requests for system resources 112 and allows or blocks respective requests based on one or more predetermined criteria. Criteria utilized by the access control component 222 can include, for example, predefined sets of allowed and/or denied communication profiles, protocols, device addresses, and/or any other suitable criteria. By way of specific example, the access control component 222 can analyze a set of provided communication requests and deny or block requests involving the transfer of system resources 112 over a WPAN using FTP. As another specific example, the access control component 222 can be configured to allow incoming requests for system resources 112 from only a corporate server that manages a fleet of devices to which a device associated with the system resources 112 belongs.

In accordance with another aspect, the security component 114 can additionally and/or alternatively include a monitoring component 224 that passively monitors incoming and/or outgoing communication requests involving associated system resources 112 in order to obtain information relating to the respective requests. In one example, one or more criteria can be defined to enable the monitoring component 224 to monitor incoming and/or outgoing requests over a WPAN involving associated system resources 112 based on the defined criteria. These criteria can include, for example, a set of communication profiles, protocols, and/or device addresses to be monitored and/or any other suitable criteria. Alternatively, the monitoring component 224 can be configured to monitor all requests involving associated system resources 112. This can be done, for example, to compile statistics relating to the operation of a device on which the system resources 112 are stored. Compiled statistics can then be utilized to perform power optimization for a device, to examine efficiency of a device, to monitor worker productivity, and/or for any other appropriate purpose.

Figure 3:
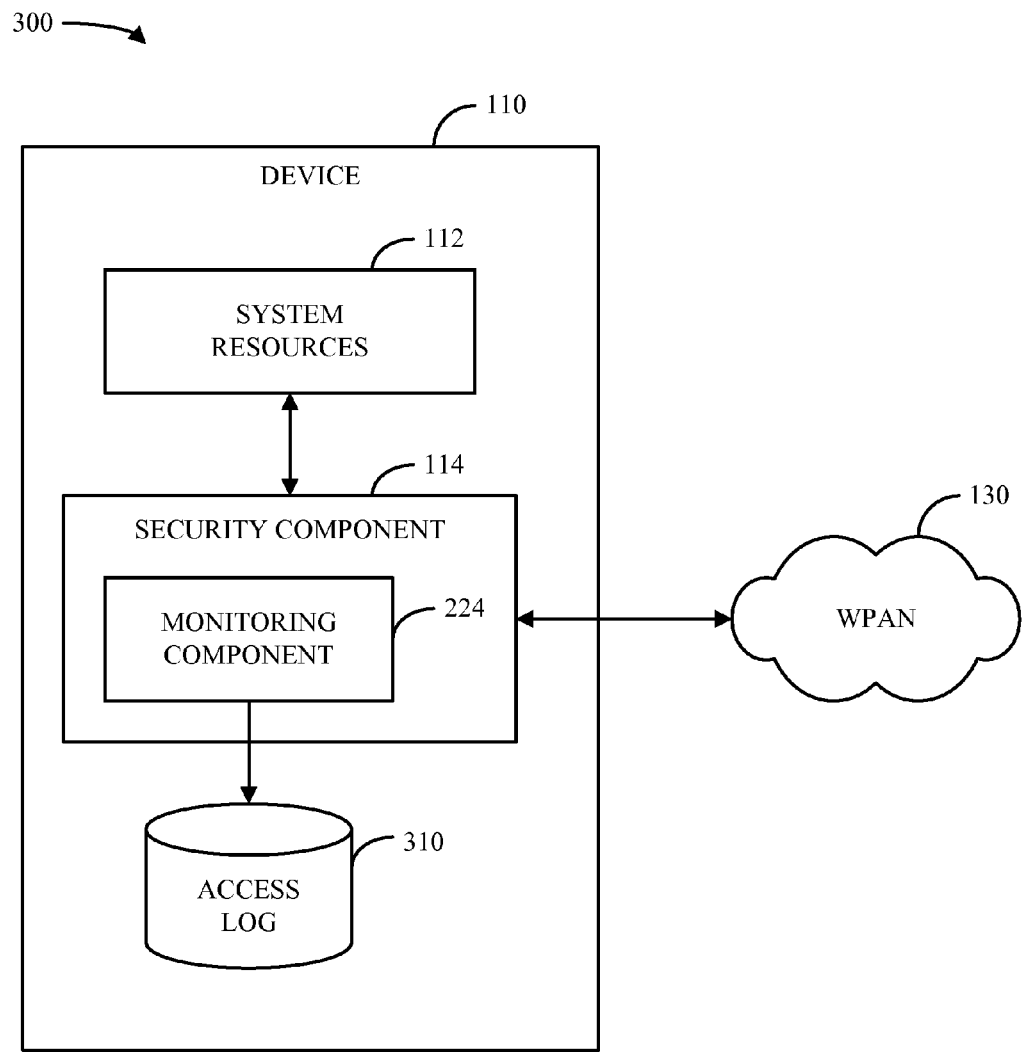
FIG. 3 is a block diagram of a system for logging wireless network activity in accordance with various aspects.

Referring now to FIG. 3, a system 300 for logging wireless network activity is illustrated. In one example, system 300 can include a device 110 that can communicate over a WPAN 130. As further illustrated by system 300, a device 110 can have stored thereon and/or otherwise associated therewith system resources 112, which can include services, information, and/or other suitable resources as generally described herein. In accordance with one aspect, a security component 114 can be further provided at the device 110 to regulate the communication and/or other use of system resources 112 over WPAN 130.

In one example, a monitoring component 224 can be provided in association with the security component 114 and/or as a standalone component associated with a device 110 to passively monitor incoming and/or outgoing uses of system resources 112 associated with the device 110. Additionally and/or alternatively, the monitoring component 224 can record incoming and/or outgoing requests for system resources 112 in an access log 310. In accordance with one aspect, the monitoring component 224 can record/compile any suitable information regarding respective requests for system resources 112 in the access log 310, such as dates and/or times of respective requests, addresses and/or other identifying information relating to entities making respective requests, communication profiles specified in respective requests, and/or other appropriate information. The monitoring component 224 can record a common set of information in an access log 310 for all monitored accesses, or alternatively varying sets of information can be used based on one or more predefined factors, such as the time, originator, or nature of a monitored request and/or other suitable factors. In one example, upon compiling an access log 310, the access log 310 can be regulated by the security component 114 as part of its associated system resources 112 and/or regarded as separate from associated system resources 112. In another example, logging performed by the monitoring component 224 can be transparent to a user of an associated device 110 and/or another device connected via a WPAN 130 such that the user is not made aware that logging is taking place.

In accordance with one aspect, the monitoring component 224 can maintain an access log 310 for all accesses to associated system resources 112, or alternatively the monitoring component 224 can be configured to record only a subset of such accesses. For example, an owner or user of a device 110 can specify a class of authorized and/or unauthorized uses (e.g., by communication profile, originator identity, access time, etc.), and the monitoring component 224 can be configured to record only those access requests that are classified as unauthorized. Thus, in an example involving an attack on system resources 112, the monitoring component 224 can be utilized to obtain and record information relating the attack and its originator(s) in a transparent fashion such that the originator(s) of the attack are not made aware that the attacks are being recorded in the access log 310. Subsequently, based on the recorded information in the access log 310, unauthorized uses of system resources 112 can be blocked and/or other appropriate actions can be taken.

In accordance with another aspect, an access log 310 compiled by the monitoring component 224 can be utilized to determine WPAN usage statistics for an associated device 110 for use in various applications for managing the operation of the device 110. By way of example, a number of WPAN connections made throughout the course of a predefined time period (e.g., hour, working shift, day, etc.) can be monitored to facilitate analysis and/or optimization of device power usage. As another example, usage statistics collected by the monitoring component 224 can be utilized to monitor productivity associated with a device 110. For example, in a non-limiting case where the device 110 associated with the monitoring component 224 is a barcode scanner, the monitoring component 224 can compile data pertaining to the number of items scanned by the device 110 in a predetermined timeframe, and these data can subsequently be compared to a baseline or expected usage rate to determine user productivity.

Figure 4:
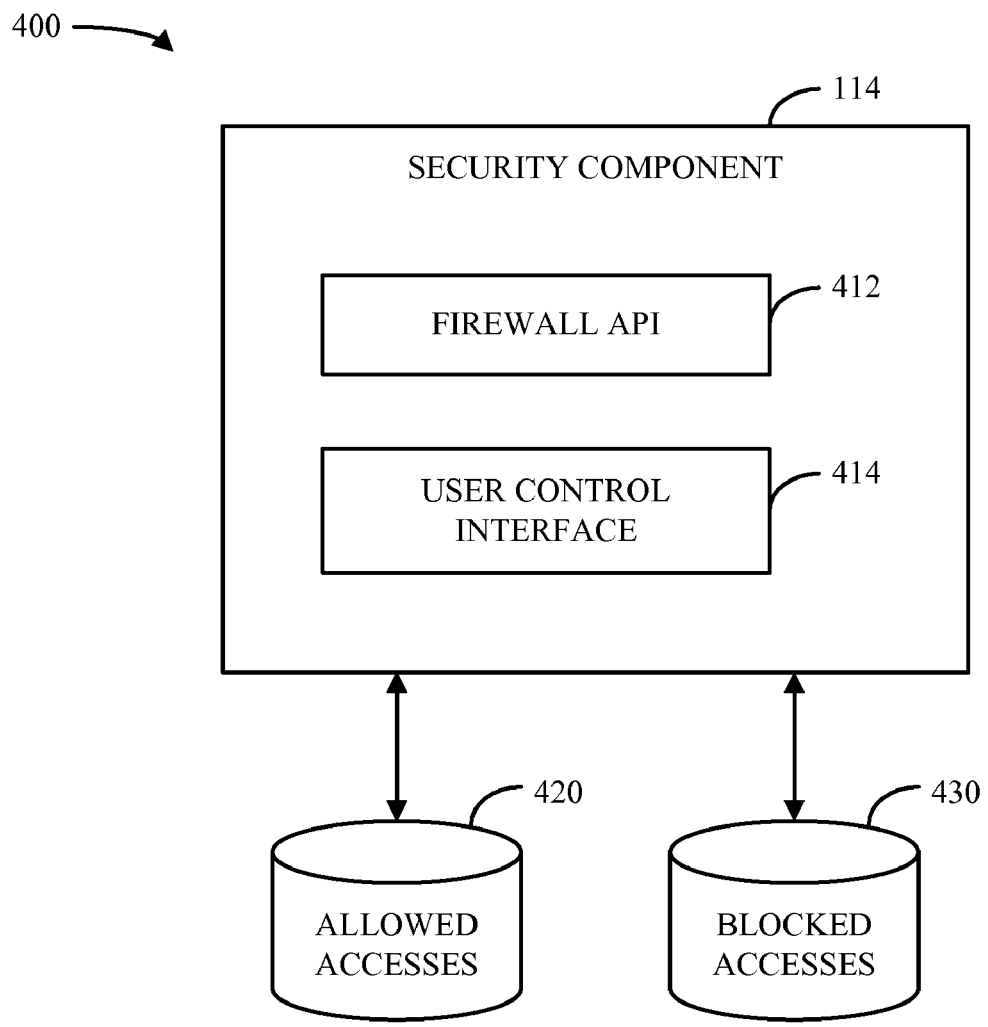
FIG. 4 is a block diagram of a system for configuring a WPAN firewall in accordance with various aspects.

Turning to FIG. 4, a system 400 for configuring a WPAN firewall in accordance with various aspects is illustrated. As FIG. 4 illustrates, system 400 can include a security component 114, which can operate as a WPAN firewall to secure incoming and/or outgoing access to associated communication and/or computing resources (e.g., system resources 112). In one example, the security component 114 can regulate access to secured resources by allowing or denying access to the secured resources on a request-by-request basis based on a defined set of allowed accesses 420 and/or a defined set of blocked accesses 430. Additionally and/or alternatively, the security component 114 can utilize sets 420 and/or 430 to identify requests to be monitored and/or recorded as described above with respect to system 300.

In accordance with one aspect, a firewall Application Programming Interface (API) 412 and/or a user control interface 414 can be associated with the security component 114 to allow one or more users and/or other entities to define sets 420-430 and/or other appropriate aspects of the operation of a WPAN firewall. In one example, a set of allowed accesses 420 and/or a set of blocked accesses 430 can be defined with respect to one or more communication profiles, such as FTP transfer, OBEX transfer, and/or one or more other suitable use cases. Sets 420-430 can be defined such that all communication requests relating to a particular profile are allowed and/or denied, or alternatively communication requests pertaining to a particular profile can be allowed and/or denied based on the originator of the request and/or other aspects of the request. For example, a firewall API 412 and/or user control interface 414 can be utilized to configure the security component 114 to block all connection requests that attempt to access the FTP profile. Alternatively, connection requests that attempt to access the FTP profile can be allowed in some cases, such as a case in which a request originates from a corporate server, and denied in other cases. In another example, sets 420-430 can be defined based on the originator of a connection request. For example, a firewall API 412 and/or user control interface 414 can be utilize to configure the security component 114 to block all connection requests, regardless of profile requested, from devices not already paired with an associated device and/or belonging to a "trusted" list of devices at the associated device.

In accordance with another aspect, a firewall API 412 can be utilized by an owner and/or provider of an associated device to define low-level controls for the security component 114, while the user control interface 414 can be utilized to facilitate user customization of the security component 114 within bounds defined by the firewall API 412. In one example, the extent to which configurability is distributed between the firewall API 412 and the user control interface 414 can be based on the level of technical expertise of a user of an associated device, the relationship between the user of an associated device and its owner, or the like. For example, users with greater knowledge of security configuration can be given greater control by the firewall API 412 to configure the security component 114 via a user control interface 414. As another example, in the case of a fleet of terminals (e.g., owned by an organization) that are utilized for simple tasks such as responding to displayed prompts or the like and terminal management is performed by the owner of the fleet, greater control can be retained by the firewall API 412 in order to facilitate en masse management and programming of the terminals.

As an additional example, an owner and/or other provider of a device to a user that is disparate from the owner can configure the firewall API 412 to retain a substantially high degree of control over the operation of the security component 114 in the event that a device contains confidential information that is to be protected from outbound transfer by the user. For example, a security component 114 and associated firewall API 412 can be utilized for a fleet of devices associated with a company or other organization where confidential information is utilized to configure the devices such that their users cannot transfer the confidential information out of the devices. In such an example, a device can have an associated interface that facilitates basic configuration of its WPAN stack. A user of the device may desire to utilize this interface and/or write one or more programs in order to transfer confidential information from the device over a WPAN; however, as generally described herein, an associated security component 114 can be utilized to prevent such a transfer from occurring. Further, if the security component 114 is configured to utilize a firewall API 412 as a substantially exclusive access mechanism and the firewall API 412 is made private, it can be appreciated that a user of the device can be rendered unable to transfer confidential information out of an associated device over a WPAN even if the user has sufficient knowledge of the device and its basic WPAN functionality to configure the communication stack of the device.

In accordance with one aspect, the firewall API 412 can be utilized to provide versatile, low-level customization for the operation of the security component 114 and its associated respective sets 420 and 430 of allowed and/or denied accesses. In one example, the firewall API 412 can be programmable such that a developer and/or other entity with knowledge of the API 412 can create one or more applications to configure the operation of the API 412. It can be appreciated that the programmability of the firewall API 412 can facilitate versatility in the operation of the security component 114, as a developer and/or another entity can write an application to leverage the API 412 that specifies any possible management operation or combination thereof. In another example, the firewall API 412 can be utilized in combination with a user control interface 414, such that the firewall API 412 limits aspects of operation of the security component 114 that can be controlled by a user to a selected set of aspects specified in the user control interface 414. In one example, the firewall API 412 can be hidden to a user of an associated device such that the user cannot modify the API 412 without a priori knowledge of techniques for programming it. Thus, it can be appreciated that user control of a security component 114 configured by a user control interface 414 in combination with a firewall API 412 will be limited to options provided in the user control interface 414 in most cases.

In accordance with another aspect, a user control interface 414 can be provided at an associated device to facilitate high-level customization of the security component 414 by a user of the device. In one example, an extent to which the user control interface 414 can be utilized to configure the security component 414 can be based on a firewall API 412. For example, the set of possible configurations of the security component 114 can be restricted by the firewall API 412 to a subset of possible combinations, and the user control interface 414 can facilitate configuration of the security component 114 and/or sets 420 and/or 430 within the restricted subset of possibilities. In one example, the user control interface 414 can be designed by anticipating one or more aspects of the security component 114 a user may desire to configure and presenting the ability to configure those aspects within the user control interface 414.

Figure 5:
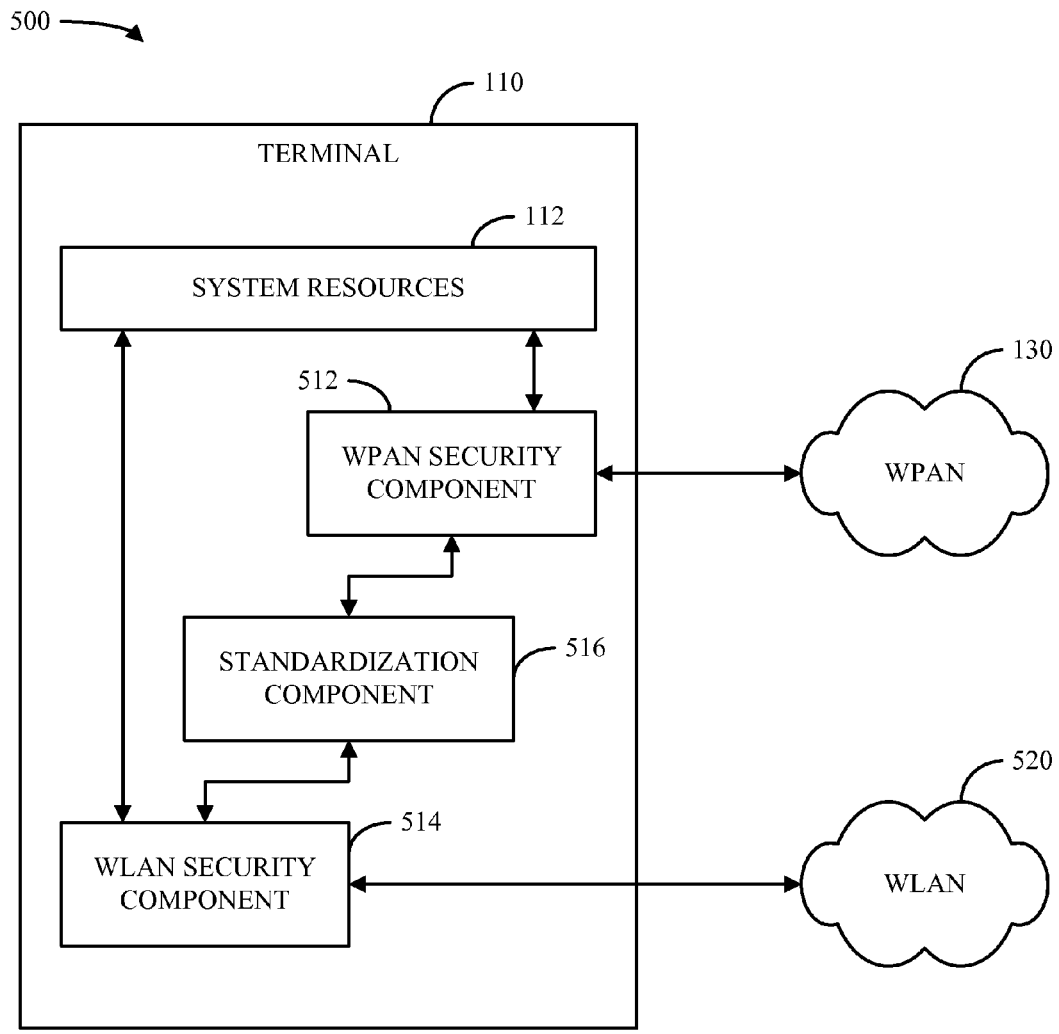
FIG. 5 is a block diagram of a system for managing security for a plurality of network connections in accordance with various aspects.

Referring to FIG. 5, a system 500 for managing security for a plurality of network connections is illustrated. System 500 can include a device or terminal 110, which can have associated system resources 112 as generally described herein. In one example, terminal 110 can facilitate communication over a plurality of networks and/or internetworks, such as a WPAN 130 and/or Wireless Local Area Network (WLAN) 520. While not illustrated in system 500, terminal 110 can also communicate over any other suitable network, such as a wired LAN and/or a wired or wireless Wide Area Network (WAN), in addition to or in place of WPAN 130 and/or WLAN 520.

In accordance with one aspect, in order to secure system resources 112 over various networks utilized by a terminal 110, the terminal 110 can utilize respective security components corresponding to the networks over which the terminal 110 communicates. For example, as illustrated by system 500, terminal 110 can include a WPAN security component 512 to secure associated system resources 112 over WPAN connection 130 and/or a WLAN security component 514 to secure system resources 112 over a WLAN connection 520. It can be appreciated that terminal 110 can be utilized to communicate laterally with a plurality of associated networks. Accordingly, for example, resources communicated over WLAN 520 can also be communicated over WPAN 130 and vice versa.

In a case where multiple networks are used by a device, security measures for the respective networks are generally independently configured. Thus, for example, WLAN 520 can be configured for a first specified level of security whereas WPAN 130 is configured independently for a second specified level of security. Accordingly, even if WLAN 520 is configured via WLAN security component 514, a WPAN connection 130 utilized by terminal 110 can be left substantially unsecured. To mitigate this shortcoming, a standardization component 516 can be provided for terminal 110 to standardize security levels across multiple networks used by terminal 110, thereby facilitating a uniform security policy across all networks utilized by terminal 110. In one example, a developer and/or other entity can utilize a standardization component 516 to manage the security of a terminal 110 more fully, in that if the security level of one or more non-WPAN radio systems are changed, the WPAN security of the terminal 110 can react accordingly. The standardization component 516 can be designed to automatically adjust the WPAN security component 512 in response to changes in security policies for other networks utilized by a terminal 110, or alternatively the standardization component 516 can be provided as a mechanism by which a developer and/or other configuring entity of the terminal 110 can standardize security levels utilized by the terminal 110.

Figure 6:
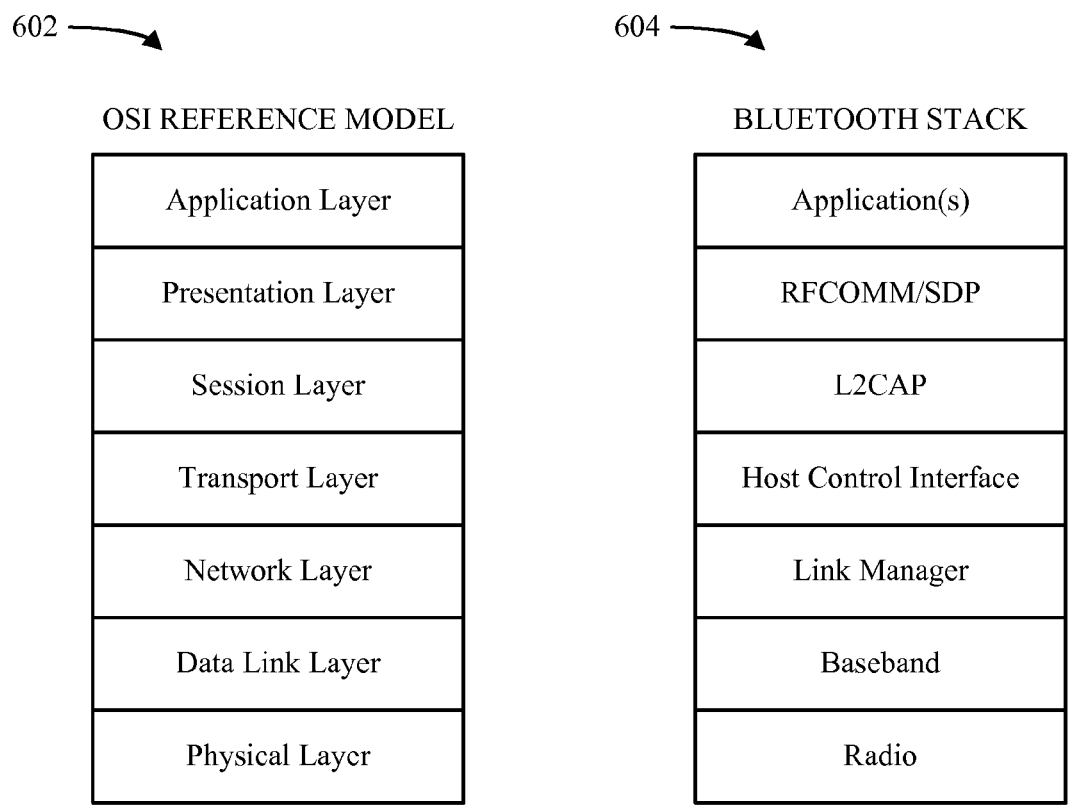
FIG. 6 illustrates a conventional network protocol model and Bluetooth stack.

With reference now to FIG. 6, illustrated are diagrams 602 and 604 of a conventional network protocol model and Bluetooth stack. More particularly, diagram 602 illustrates the The Open Systems Interconnection (OSI) Basic Reference Model, which represents a seven-layered communication protocol. The OSI reference model is illustrated as a hierarchy of layers, which consist of groups of similar functions that provide services to higher layers and receive services from lower layers. As diagram 602 illustrates, the OSI reference model includes a physical layer that defines the electrical and physical specifications for a communicating device, a data link layer that defines mechanisms for the transfer of data between communicating devices, a network layer that facilitates the transfer of data between devices over a network (e.g., using Internet Protocol (IP)), a transport layer that facilitates transparent transfer of data between users and to upper communication layers (e.g., using Transmission Control Protocol (TCP) or User Datagram Protocol (UDP)), a session layer that controls connections between devices and/or applications running thereon, a presentation layer that delivers and/or formats information to one or more application layer processes, and an application layer that performs one or more services related to an application running at a device.

Diagram 604 illustrates a communication stack that can be utilized for WPAN communication pursuant to the Bluetooth standard and/or any other suitable standard. As diagram 604 illustrates, the communication stack can include a radio protocol that specifies an air interface between communicating devices, a baseband protocol that specifies techniques for piconet connection and addressing, a link manager that manages links between WPAN-connected devices, a host control interface that allows basic configuration of WPAN communication and provides access to hardware status and/or control registers associated with a device, a Logical Link Control and Adaptation Protocol (L2CAP) that transfers information between higher-level applications and a lower-level communication link, communication services such as radio frequency communication (RFCOMM), Service Discovery Protocol (SDP), FTP, OBEX, and the like, and one or more application(s) that can leverage lower-level communication services.

Figure 7:
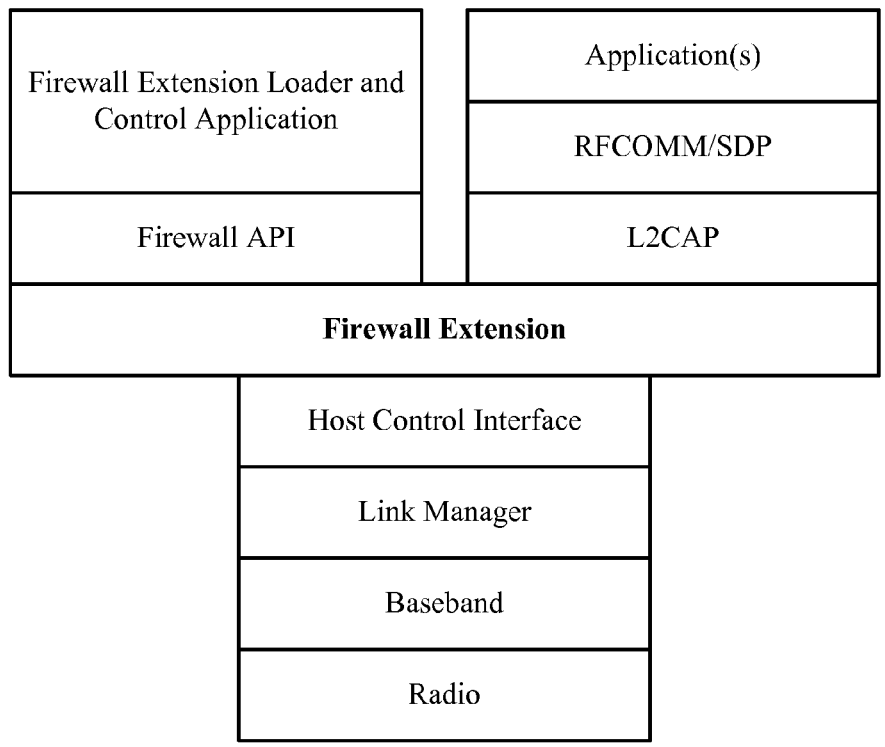
FIG. 7 illustrates implementation of a firewall extension for a Bluetooth stack in accordance with various aspects.

In accordance with one aspect, the Bluetooth stack illustrated by diagram 604 can be extended to include firewall functionality as illustrated by diagram 700 in FIG. 7. As diagram 700 illustrates, security features for WPAN communication as generally described herein can be provided by extending a Bluetooth stack utilized for WPAN communication to incorporate a firewall above the host control interface layer. In one example, a firewall can be placed above the host control interface level of the Bluetooth stack as illustrated by diagram 700 to protect system resources that are utilized by the L2CAP, services, and applications provided in the Bluetooth stack. For example, during the course of a logical Bluetooth connection, several connections can be made and/or broken, potentially repeatedly, during the course of communication. As diagram 700 illustrates, because the firewall extension is provided above the baseband and radio level of the Bluetooth stack, the firewall extension provided in diagram 700 can allow WPAN connections at the radio and/or baseband levels. However, it should be appreciated that in order for private information to be transferred over a WPAN, it is generally required to access a higher level transport service, such as FTP and/or OBEX, as well as one or more appropriate transfer applications. Accordingly, because the firewall extension illustrated by diagram 700 can be implemented below services and/or applications on the Bluetooth stack, it can be appreciated that while connections can be made at the radio and/or baseband levels, the firewall can block, monitor, and/or otherwise secure a connection that requests a list of available services and/or the use of one or more services that reside further up the stack.

In one example, the firewall extension illustrated by diagram 700 can be utilized to prevent a malicious user from connecting to a device via a WPAN and obtaining files, contact information, and/or other sensitive information from the device. In another example, the illustrated firewall extension can be utilized to prevent viruses and/or other harmful files from being transferred to a device. For example, in applications such as e-mail clients, a user can be presented with a notification that an entity wishes to transfer a file to the user. However, in many cases, the file that is the subject of the notification has already been physically transferred to the device on which the e-mail client resides, and the user is effectively presented merely with a choice as to whether or not to accept the file. In contrast, by implementing a firewall extension as illustrated by diagram 700, device access can be secured at a low level such that the file transfer is blocked from occurring altogether.

Figure 8:
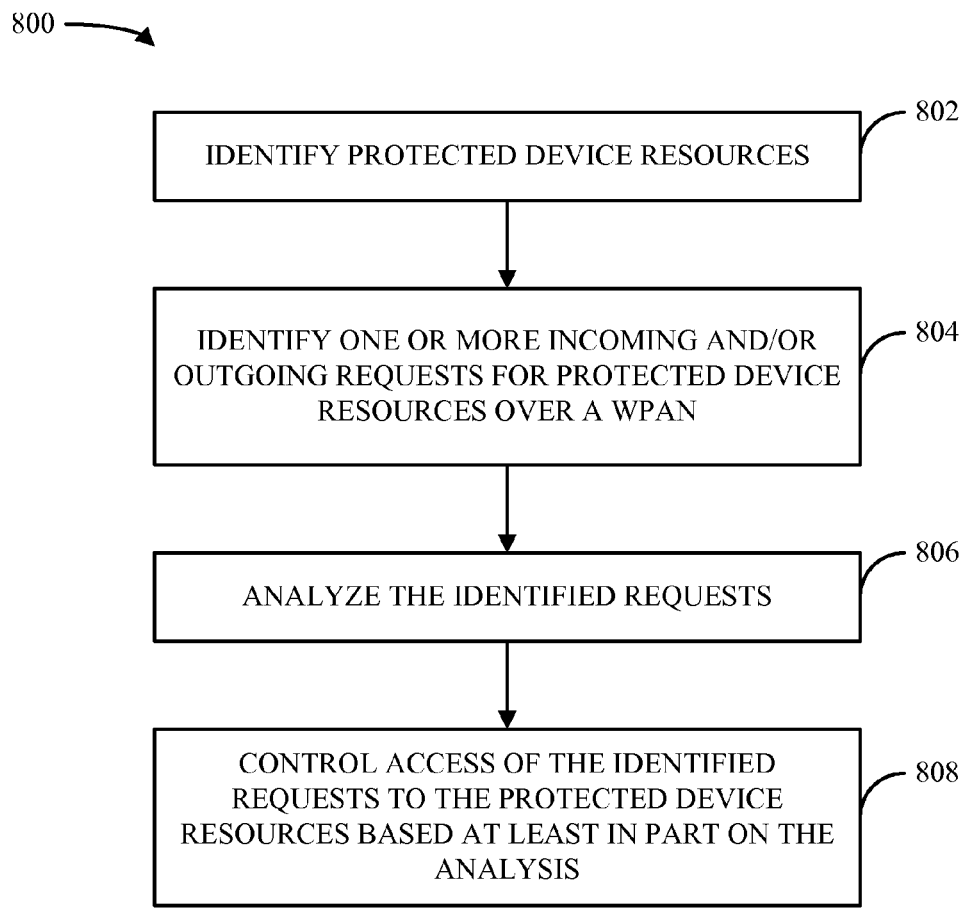
FIG. 8 is a flowchart of a method for securing resources in a WPAN.
Figure 9:
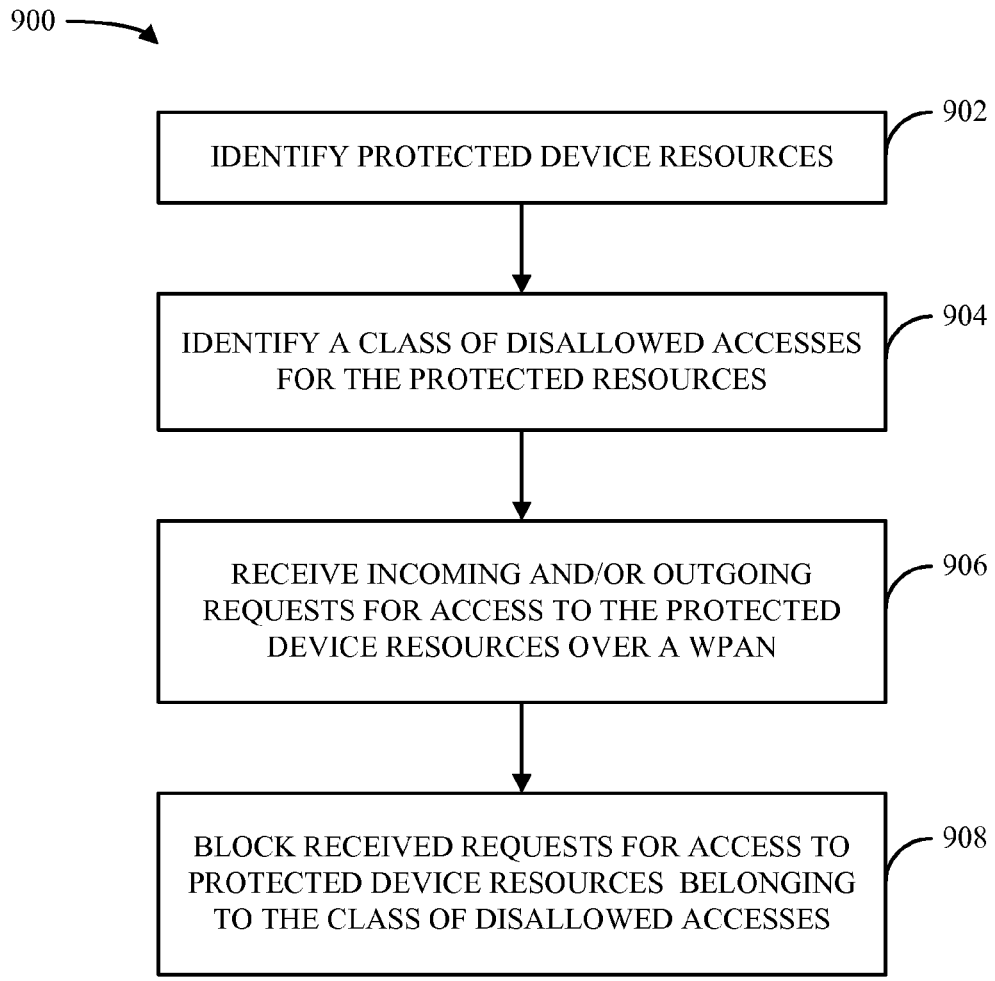
FIG. 9 is a flowchart of a method of restricting access to protected resources at a WPAN-connected device.
Figure 10:
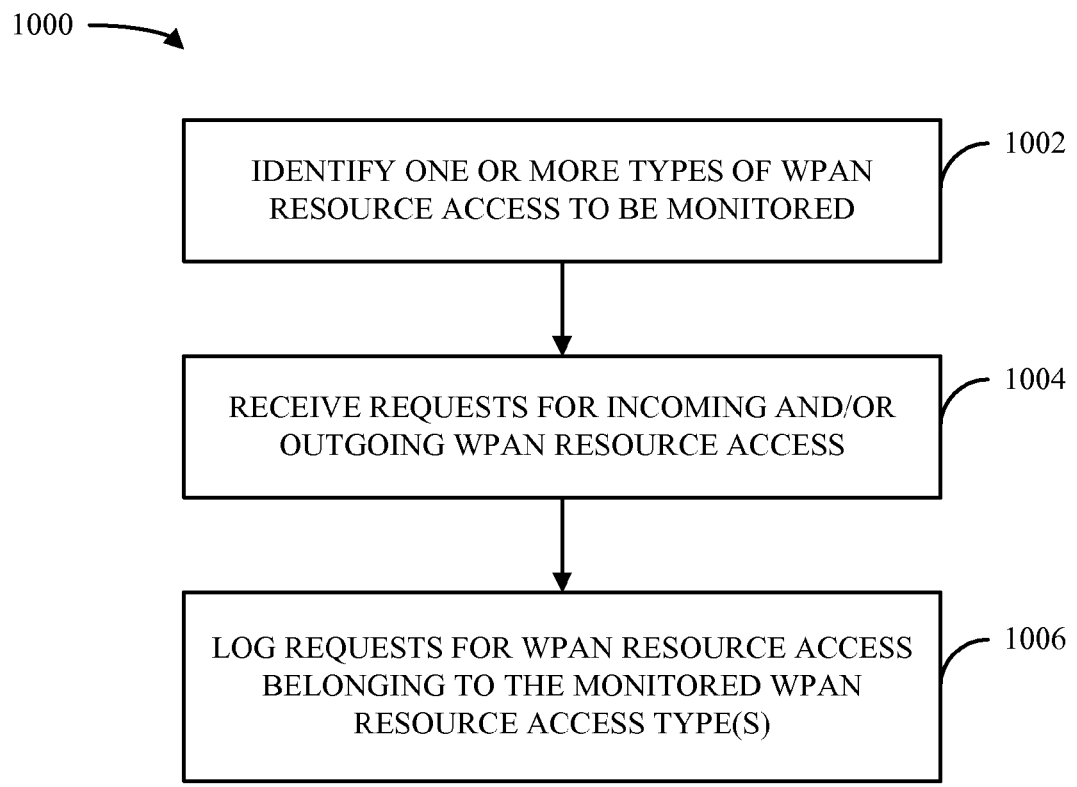
FIG. 10 is a flowchart of a method of recording network activity.

Turning to FIGS. 8-10, methodologies that may be implemented in accordance with various features presented herein are illustrated via respective series of acts. It is to be appreciated that the methodologies claimed herein are not limited by the order of acts, as some acts may occur in different orders, or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as claimed herein.

Referring to FIG. 8, a method 800 for securing resources (e.g., system resources 112) in a WPAN (e.g., WPAN 130) is illustrated. At 802, protected device resources are identified. At 804, one or more incoming and/or outgoing requests for the protected device resources identified at 802 over a WPAN are identified. At 806, the requests identified at 804 are analyzed. At 808, access of the requests identified at 804 to the protected device resources identified at 802 is controlled (e.g., by a security component 114) based on the analysis performed at 806.

FIG. 9 illustrates a method 900 of restricting access to protected resources at a WPAN-connected device (e.g., device 110). At 902, protected device resources are identified. At 904, a class of disallowed accesses (e.g., blocked access set 430) for access to the protected resources identified at 902 is identified. At 906, incoming and/or outgoing requests for the protected device resources identified at 902 over a WPAN are received. At 908, received requests for access to protected device resources belonging to the class of disallowed accesses defined at 904 are blocked (e.g., by an access control component 222).

Referring now to FIG. 10, a flowchart is provided that illustrates a method 1000 of recording network activity. At 1002, one or more types of WPAN resource accesses to be monitored are identified. At 1004, requests for incoming and/or outgoing WPAN resource access are identified. AT 1006, requests for WPAN resource access received at 1004 that belong to the monitored WPAN access type(s) identified at 1002 are logged (e.g., to an access log 310 by a monitoring component 224).

Figure 11:
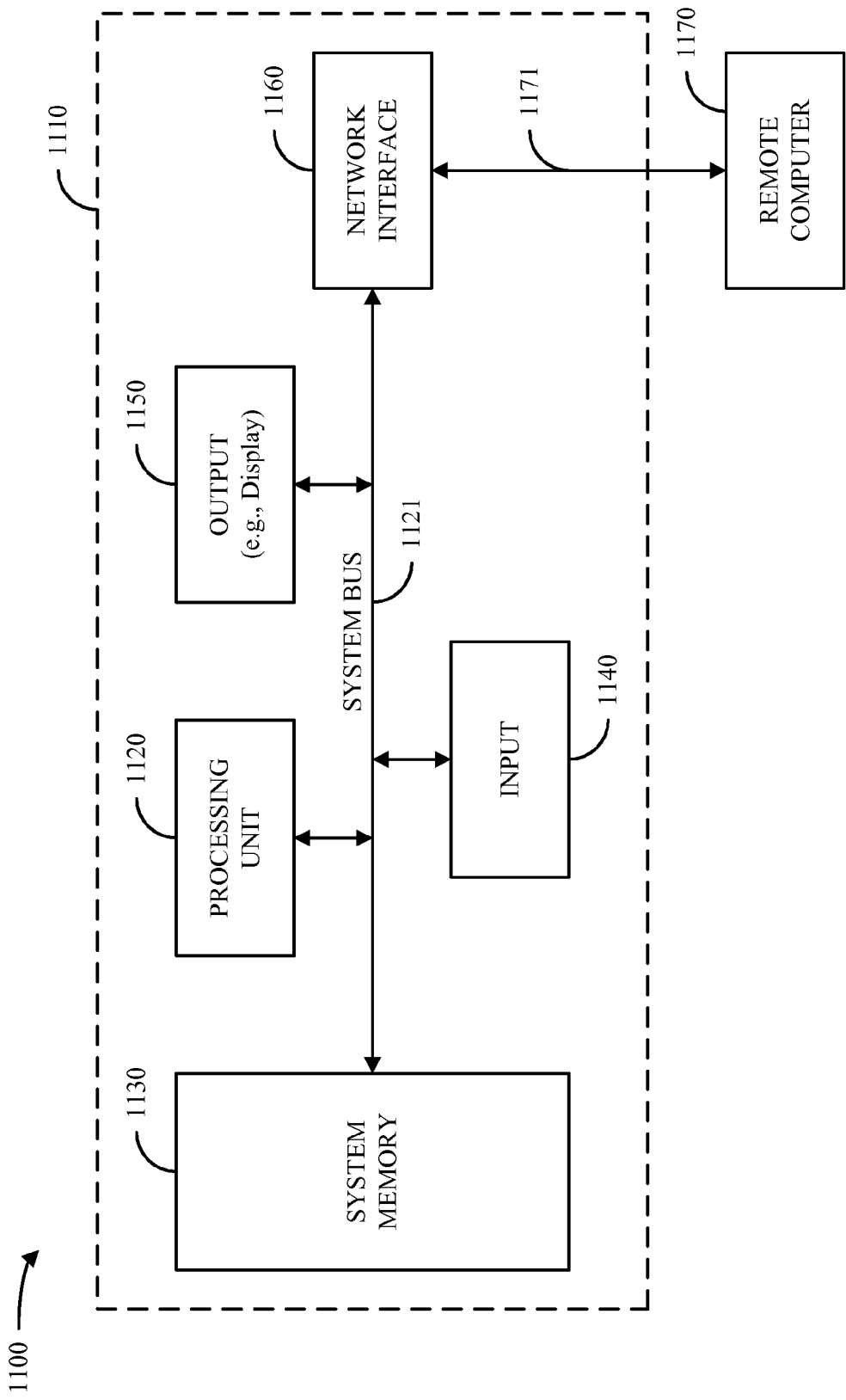
FIG. 11 is a block diagram of a computing system in which various aspects described herein can function.

Turning to FIG. 11, an example computing system or operating environment in which various aspects described herein can be implemented is illustrated. One of ordinary skill in the art can appreciate that handheld, portable and other computing devices and computing objects of all kinds are contemplated for use in connection with the claimed subject matter, e.g., anywhere that a network can be desirably configured. Accordingly, the below general purpose computing system described below in FIG. 11 is but one example of a computing system in which the claimed subject matter can be implemented.

Although not required, the claimed subject matter can partly be implemented via an operating system, for use by a developer of services for a device or object, and/or included within application software that operates in connection with one or more components of the claimed subject matter. Software may be described in the general context of computer executable instructions, such as program modules, being executed by one or more computers, such as client workstations, servers or other devices. Those skilled in the art will appreciate that the claimed subject matter can also be practiced with other computer system configurations and protocols.

FIG. 11 thus illustrates an example of a suitable computing system environment 1100 in which the claimed subject matter can be implemented, although as made clear above, the computing system environment 1100 is only one example of a suitable computing environment for a media device and is not intended to suggest any limitation as to the scope of use or functionality of the claimed subject matter. Further, the computing environment 1100 is not intended to suggest any dependency or requirement relating to the claimed subject matter and any one or combination of components illustrated in the example operating environment 1100.

With reference to FIG. 11, an example of a computing environment 1100 for implementing various aspects described herein includes a general purpose computing device in the form of a computer 1110. Components of computer 1110 can include, but are not limited to, a processing unit 1120, a system memory 1130, and a system bus 1121 that couples various system components including the system memory to the processing unit 1120. The system bus 1121 can be any of several types of bus structures including a memory bus or memory controller, a peripheral bus, and a local bus using any of a variety of bus architectures.

Computer 1110 can include a variety of computer readable media. Computer readable media can be any available media that can be accessed by computer 1110. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media can embody computer readable instructions, data structures, program modules or other data in a modulated data signal such as a carrier wave or other transport mechanism and can include any suitable information delivery media.

The system memory 1130 can include computer storage media in the form of volatile and/or nonvolatile memory such as read only memory (ROM) and/or random access memory (RAM). A basic input/output system (BIOS), containing the basic routines that help to transfer information between elements within computer 1110, such as during start-up, can be stored in memory 1130. Memory 1130 can also contain data and/or program modules that are immediately accessible to and/or presently being operated on by processing unit 1120. By way of non-limiting example, memory 1130 can also include an operating system, application programs, other program modules, and program data.

The computer 1110 can also include other removable/non-removable, volatile/nonvolatile computer storage media. For example, computer 1110 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 1121 through a non-removable memory interface such as an interface, and a magnetic disk drive or optical disk drive can be connected to the system bus 1121 by a removable memory interface, such as an interface.

A user can enter commands and information into the computer 1110 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 1120 through user input 1140 and associated interface(s) that are coupled to the system bus 1121, but can be connected by other interface and bus structures, such as a parallel port, game port or a universal serial bus (USB). A graphics subsystem can also be connected to the system bus 1121. In addition, a monitor or other type of display device can be connected to the system bus 1121 via an interface, such as output interface 1150, which can in turn communicate with video memory. In addition to a monitor, computers can also include other peripheral output devices, such as speakers and/or a printer, which can also be connected through output interface 1150.

The computer 1110 can operate in a networked or distributed environment using logical connections to one or more other remote computers, such as remote computer 1170, which can in turn have media capabilities different from device 1110. The remote computer 1170 can be a personal computer, a server, a router, a network PC, a peer device or other common network node, and/or any other remote media consumption or transmission device, and can include any or all of the elements described above relative to the computer 1110. The logical connections depicted in FIG. 11 include a network 1171, such as a local area network (LAN) or a wide area network (WAN), but can also include other networks/buses. Such networking environments are commonplace in homes, offices, enterprise-wide computer networks, intranets and the Internet.

When used in a LAN networking environment, the computer 1110 is connected to the LAN 1171 through a network interface or adapter. When used in a WAN networking environment, the computer 1110 can include a communications component, such as a modem, or other means for establishing communications over the WAN, such as the Internet. A communications component, such as a modem, which can be internal or external, can be connected to the system bus 1121 via the user input interface at input 1140 and/or other appropriate mechanism. In a networked environment, program modules depicted relative to the computer 1110, or portions thereof, can be stored in a remote memory storage device. It should be appreciated that the network connections shown and described are non-limiting examples and that other means of establishing a communications link between the computers can be used.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the described aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A device, comprising:
a radio for establishing a baseband connection for communication with another device over a Wireless Personal Area Network (WPAN);
a central processing unit;
a memory coupled to the processing unit, the memory comprising:
a plurality of system resources associated with the device; and
a firewall component encoded with instructions, which when executed by the central processing unit analyzes one or more requests from the other device to establish a logical connection to access the system resources associated with the device over the WPAN and blocks the establishment of the logical connection with the other device to prevent unauthorized use of the system resources associated with the device based at least in part on the analysis of the one or more requests while maintaining the established baseband connection with the other device, wherein the firewall component is implemented on a Bluetooth protocol stack utilized for communication over the WPAN that secures the system resources associated with the device;
wherein the firewall component comprises a monitoring component that monitors and obtains information relating to respective requests for access to the system resources associated with the device and wherein the monitoring component logs information relating to requests for unauthorized use of the system resources associated with the device;
wherein the firewall component comprises a standardization component that facilitates adjustment of a security policy utilized by the firewall component for securing system resources associated with the device over the WPAN based on the security policy utilized by the device for securing system resources over at least one other network.

2. The device of claim 1, wherein the firewall component comprises an access control component that selectively denies access to the system resources associated with the device for one or more requests based on one or more predefined criteria.

3. The device of claim 1, wherein the monitoring component further compiles statistics relating to usage of the device over the WPAN.

4. The device of claim 1, wherein the firewall component comprises an Application Programming Interface (API) that facilitates configuration of the firewall component.

5. The device of claim 4, wherein the API provides one or more user-controllable parameters relating to operation of the firewall component, and the firewall component further comprises a user control interface that facilitates adjustment of the user-controllable parameters.

6. The device of claim 1, wherein the one or more requests comprise at least one incoming request for access to the system resources associated with the device provided by another device connected to the WPAN and at least one outgoing request for communication of system resources associated with the device over the WPAN.

7. The device of claim 1, wherein the firewall component comprises the firewall implemented on the Bluetooth protocol stack utilized for communication over the WPAN that secures the system resources associated with the device with respect to at least one of application-level, presentation-level, or session-level access.

8. The device of claim 1, wherein the system resources associated with the device comprise at least one of files, services, or contact information.

9. A method of securing resources over a Wireless Personal Area Network (WPAN), comprising:
   establishing, by a device having a plurality of system resources, a baseband connection for communication with another device over the WPAN;
   identifying a request from the other device for establishing a logical connection for the other device to access the system resources associated with the device over the WPAN;
   analyzing the request from the other device; and
   preventing access by the other device to the system resources over the WPAN based at least in part on the analysis of the request by blocking the establishment of the logical connection with the other device using a firewall component while maintaining the established baseband connection with the other device, wherein the firewall component is implemented on a Bluetooth protocol stack in a memory of the device utilized for communication over the WPAN that secures the system resources associated with the device;
   wherein the firewall implemented on the Bluetooth protocol stack blocks a connection that requests the system resources provided by at least one of application-level, presentation level, and session level of the Bluetooth protocol stack while connection is established at either a radio-level or baseband-level of the Bluetooth protocol stack.

10. The method of claim 9, wherein the analyzing comprises identifying a class of disallowed accesses associated with the system resources, and the controlling comprises denying respective requests for access to the system resources belonging to the class of disallowed accesses.

11. The method of claim 10, wherein the class of disallowed accesses is based on at least one of a communication service associated with a request, information specified in a request, or identity of an originator of a request.

12. The method of claim 9, wherein the analyzing comprises identifying one or more types of WPAN resource access to be monitored, and the controlling comprises logging respective identified requests belonging to the one or more types of WPAN resource access to be monitored.

13. The method of claim 9, wherein the analyzing comprises identifying one or more security parameters provided by an Application Programming Interface (API), and the controlling comprises controlling access of respective analyzed requests to the system resources based on the security parameters provided by the API.

14. The method of claim 13, wherein the analyzing further comprises identifying one or more user-definable security parameters defined by the API and user inputs respectively associated therewith, and the controlling further comprises controlling access of respective analyzed requests to the system resources based on the security parameters provided by the API and the user inputs.

15. The method of claim 9, wherein the controlling comprises controlling access of respective analyzed requests to the system resources over the WPAN based at least in part on one or more security parameters adapted from security parameters utilized for a network disparate from the WPAN over which the device operates.

* * * * *